United States Patent
Di Giovine et al.

(10) Patent No.: US 9,995,455 B2
(45) Date of Patent: Jun. 12, 2018

(54) LIGHT INDICATOR

(71) Applicant: C & E S.r.l., Oggiono (Lecco) (IT)

(72) Inventors: Alfonso Di Giovine, Oggiono (IT);
Maria Cristina Di Giovine, Lecco (IT)

(73) Assignee: C & E GROUP S.R.L., Milan (IT)

( * ) Notice: Subject to any disclaimer, the term of this patent is extended or adjusted under 35 U.S.C. 154(b) by 0 days. days.

(21) Appl. No.: 15/279,456

(22) Filed: Sep. 29, 2016

(65) Prior Publication Data
US 2017/0097138 A1    Apr. 6, 2017

(30) Foreign Application Priority Data
Oct. 5, 2015   (IT) .................. 202015000058322

(51) Int. Cl.
| | |
|---|---|
| *F21V 5/04* | (2006.01) |
| *F21V 23/00* | (2015.01) |
| *F21V 17/12* | (2006.01) |
| *F21V 17/10* | (2006.01) |
| *F21V 31/00* | (2006.01) |
| *G02B 27/30* | (2006.01) |
| *F21Y 115/10* | (2016.01) |
| *F21W 111/00* | (2006.01) |

(52) U.S. Cl.
CPC .............. *F21V 5/04* (2013.01); *F21V 5/046* (2013.01); *F21V 17/101* (2013.01); *F21V 17/12* (2013.01); *F21V 23/005* (2013.01); *F21V 31/005* (2013.01); *G02B 27/30* (2013.01); *F21W 2111/00* (2013.01); *F21Y 2115/10* (2016.08)

(58) Field of Classification Search
CPC ......... F21V 5/046; F21V 17/12; F21V 31/005
See application file for complete search history.

(56) References Cited

U.S. PATENT DOCUMENTS

| | | | | |
|---|---|---|---|---|
| 5,224,773 A | * | 7/1993 | Arimura | F21V 5/00 362/227 |
| 5,929,788 A | * | 7/1999 | Vukosic | B60Q 1/2611 340/471 |
| 6,483,439 B1 | | 11/2002 | Vukosic | |
| 6,626,557 B1 | * | 9/2003 | Taylor | F21V 9/10 362/231 |

(Continued)

FOREIGN PATENT DOCUMENTS

| | | | | |
|---|---|---|---|---|
| CN | 203190312 U | * | 9/2013 | ................ F21V 5/04 |
| KR | 200 473 501 Y1 | | 7/2014 | |

OTHER PUBLICATIONS

Anonymous: "Aviation Obstruction Lights & Beacons LED Low-intensity Obstruction Aviation Light Type A (SS-L810A)—Shenzhen Star Standard Electromechanical Facilities Engineering Co., Ltd.-", Jun. 3, 2015 (Jun. 3, 2015), XP055318209, Retrieved from the Internet: URL:https://web.archive.org/web/20150603023630/http://www.star-standard.com/Product/show-7-110-1.htm.

*Primary Examiner* — Alan Cariaso
(74) *Attorney, Agent, or Firm* — Mark M. Friedman

(57) ABSTRACT

Light indicator, which comprises: a support body provided with a support face on which a light source is mounted that is provided with a light emission axis, an optical lens which is placed to cover the support face and comprises a collimation portion placed to intercept the light emission axis of the light source, and an attachment portion projectingly extended around the collimation portion, integrally made with such collimation portion (9), and sealingly fixed to the support body.

17 Claims, 6 Drawing Sheets

(56) References Cited

U.S. PATENT DOCUMENTS

| | | | | |
|---|---|---|---|---|
| 6,905,228 B1* | 6/2005 | Takeyasu | ............ | F21V 5/046 257/432 |
| 7,703,950 B2* | 4/2010 | Ewert | ............ | B29C 45/0025 362/311.02 |
| 7,726,837 B2* | 6/2010 | Ewert | ............ | F21S 8/00 340/815.45 |
| 2004/0004836 A1 | 1/2004 | Dubuc | | |
| 2005/0007784 A1 | 1/2005 | Stein et al. | | |

* cited by examiner

LIGHT INDICATOR

FIELD OF APPLICATION

The present finding refers to a light indicator, according to the preamble of the independent claim.

The present light indicator is inserted in the industrial field of production of light indicators and illumination apparatuses in particular provided with light sources of LED type, and is intended to be advantageously employed for indicating to aircraft the presence of high structures, such as smokestacks, towers, skyscrapers, bridges, power line pylons, etc.

In particular, the aforesaid light indicator is advantageously employed for signaling the presence of towers or other high buildings, especially those situated in urban areas.

STATE OF THE ART

It is known to use light indicators mounted for example on towers, on smokestacks or on industrial plant and factory buildings, or on bridges, pylons etc., in order to indicate the presence of aerial obstacles to vehicles such as airplanes and helicopters.

In particular, increasingly widespread on the market are light indicators provided with light sources of LED type, since the latter demonstrate greater luminous efficiency than most of the light sources of conventional type (such as incandescent lamps, fluorescent lamps, discharge lamps).

More in detail, one example light indicator of known type comprises a metal tubular body, which is provided with an external surface on which a plurality of LEDs are mounted; each LED is oriented with its light emission axis orthogonal to the external surface of the tubular body.

In addition, the light indicator comprises a plurality of lenses, each of which fixed on the external surface of the tubular body in front of the LED, intercepting the light emission axis of the latter, and adapted to concentrate the light emitted by such LED into light beams mainly oriented along a horizontal optical axis.

More in detail, each lens comprises a substantially hemispherical body of transparent material, provided with an internal cavity in which the corresponding LED is housed, and with a base edge fixed to the external surface of the tubular body around the LED itself.

In particular, each lens is fixed to the external surface of the tubular body of the light indicator by means of an adhesive material layer arranged between the base edge of the lens and the external surface of the tubular body.

The indicator also comprises a cylindrical transparent plate, which is arranged around the external surface of the tubular body to protect the LEDs and defines, with such external surface, an air space in which the LEDs themselves and the respective lenses are housed.

In addition, the transparent plate is closed on the top and bottom, respectively, by an upper cover and by a lower cover fixed to the corresponding ends of the tubular body itself and provided with corresponding annular grooves in which the corresponding edge of the transparent plate is inserted.

In particular, the upper cover and lower cover are provided with corresponding annular sealing gaskets, each of which arranged in the annular groove of the corresponding cover in order to prevent the entrance of water or humidity inside the air space where the LEDs are housed.

One drawback of the above-described light indicator of known type is due to the fact that it is structurally complex, in that it requires the attainment of the transparent protection plate, of suitable covers with the corresponding gaskets for protecting the LEDs from weathering agents, with consequent increase of production costs of the indicator itself. In addition, such structural complexity requires the execution of various operations for mounting the different components of the indicator, with consequent long times for the assembly of the indicator itself.

A further drawback of the above-described indicator of known type is due to the fact that, following for example the wear of the sealing gaskets, weathering agents (such as water or humidity) can easily enter into the air space where the LEDs are housed, coming into contact with the latter and thus causing damage or malfunctioning of the indicator itself.

Presentation of the Finding

In this situation, the essential object of the present finding is therefore that of overcoming the drawbacks manifested by the solutions of known type, by providing a light indicator that is structurally simple and inexpensive to make.

Further object of the present finding is to provide a light indicator capable of operating in an entirely efficient manner.

Further object of the present finding is to provide a light indicator that is easy to assemble.

BRIEF DESCRIPTION OF THE DRAWING

The technical characteristics of the finding, according to the aforesaid objects, can be clearly seen in the contents of the below-reported claims and the advantages thereof are more evident from the following detailed description, made with reference to the enclosed drawings, which represent several merely exemplifying and non-limiting embodiments of the invention, in which:

DETAILED DESCRIPTION OF A PREFERRED EMBODIMENT

Figure 1:
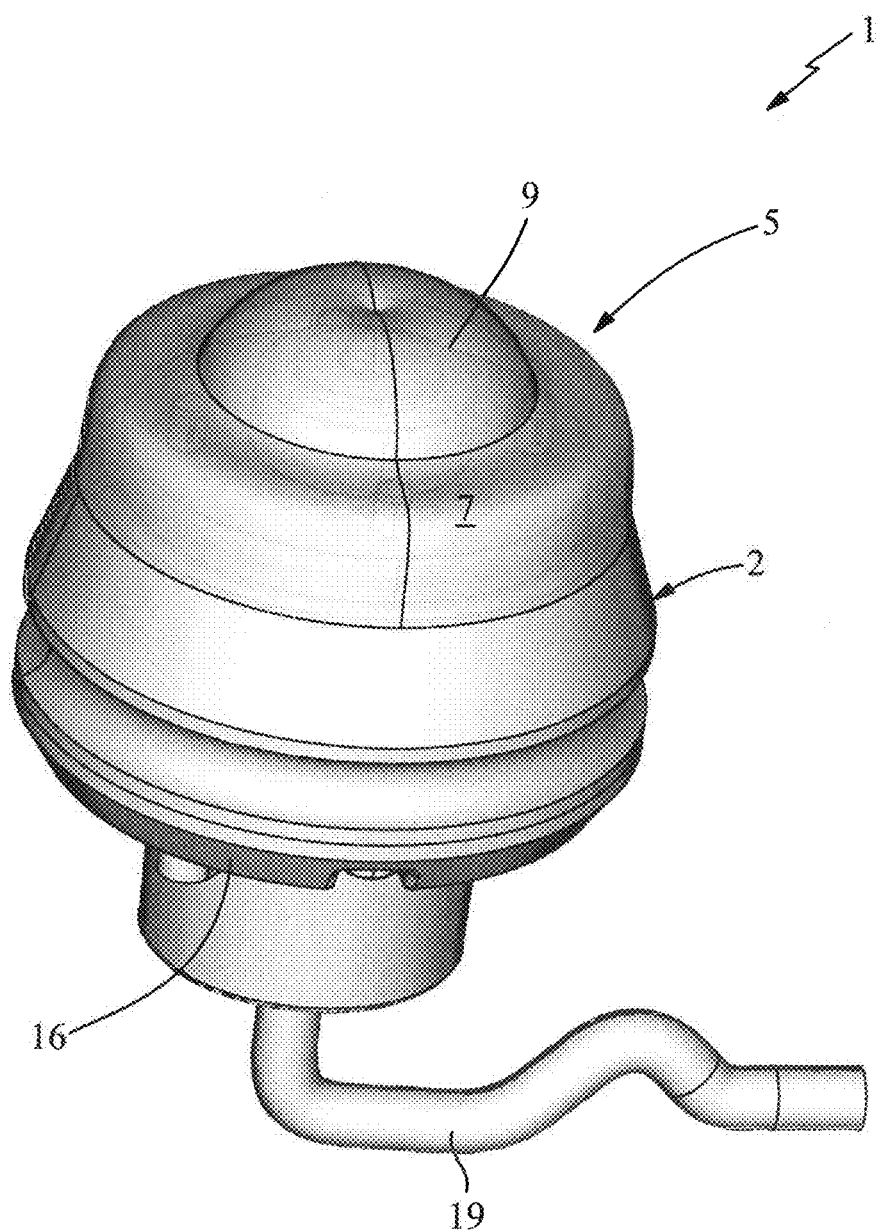
FIG. 1 shows a perspective view of the light indicator, object of the present finding.
Figure 2:
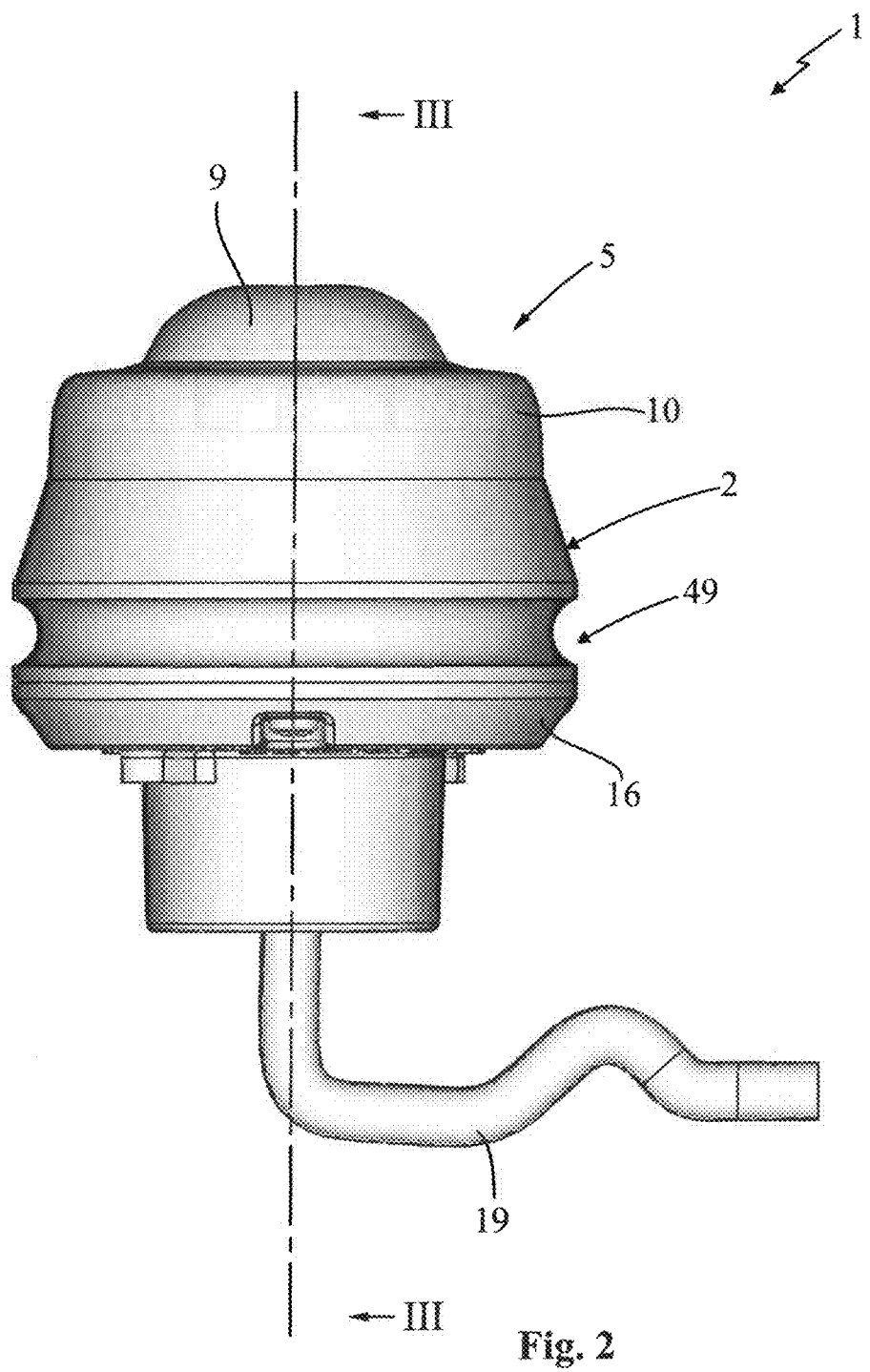
FIG. 2 shows a side view of the light indicator illustrated in FIG. 1.

With reference to the enclosed drawings, reference number 1 overall indicates the light indicator, object of the present finding.

The present light indicator 1 is intended to be advantageously mounted on high buildings (such as skyscrapers, towers, etc.) or on high structures (such as bridges, pylons, smokestacks etc.) in order to indicate the presence of aerial obstacles to vehicles such as airplanes and helicopters.

According to the present finding, the light indicator 1 comprises a support body 2 provided with a support face 3, at which a light source 4 is arranged that is provided with a light emission axis X preferably orthogonal to the support face 3 itself and in particular substantially vertical.

The support face 3 of the support body 2 is advantageously preferably flat and is preferably intended to be directed upward and arranged in particular horizontally.

The light indicator 1 comprises an optical lens 5 which is placed to cover the support face 3, on which the light source 4 is arranged, and is provided with an internal surface 6 and with an external surface 7 intended to come into contact with the external environment. The internal surface 6 of the optical lens 5 is at least partially directed towards such support face 3 and defines a cavity 8 in which the light source 4 is housed. More in detail, the optical lens 5 comprises a collimation portion 9, preferably central, placed to intercept the light emission axis X of the light source 4, and arranged for at least partially intercepting the light rays emitted by the light source 4 and for projecting corresponding collimated light beams according to at least one projection direction Y orthogonal to the aforesaid light emission axis X and in particular substantially horizontal.

Advantageously, the collimation portion 9 of the optical lens 5 is arranged for projecting the light beams along projection directions Y that are radial with respect to the light emission axis X and preferably over a 360° angle around such light emission axis X.

According to the finding, the optical lens 5 comprises an attachment portion 10, preferably peripheral, projectingly extended around the collimation portion 9 of the optical lens 5 itself, integrally made with such collimation portion 9, and sealingly fixed to the support body 2.

In addition, the light indicator 1 comprises retention means 11 connected to the support body 2 and to the attachment portion 10 of the optical lens 5 and adapted to retain the optical lens 5 integral with the support body 2.

Advantageously, the optical lens 5 of the light indicator 1 according to the finding allows protecting the light source 4 from weathering agents (such as rain, humidity, etc.) and simultaneously allows collimating the light rays emitted by the light source 4 according to the desired projection direction Y, hence involving a structural simplification of the light indicator 1, in particular without having to arrange further covers for protecting the light source 4.

Advantageously, the light indicator 1 comprises a control unit 100 arranged inside the support body 2 and electrically connected to the light source 4 in order to actuate the latter by means of first electrical connections (not illustrated in the enclosed figures).

The control unit 100 is intended to be connected, in particular by means of second electrical connections (not illustrated), to an electrical energy source from which it receives the electric current for power supplying the light source 4 of the light indicator 1.

Advantageously, the light source 4 comprises at least one LED 12 arranged in particular for emitting the light rays over a propagation angle of 360° around the light emission axis X of the light source 4 itself, preferably with a light emission cone comprised between about 120° and 180°.

Advantageously, the light source 4 comprises a circuit board 13 provided with a rear face fixed to the support face 3 of the support body 2, and with a front face on which the LED 12 is fixed.

In particular, the circuit board 13 comprises a printed circuit, in particular of metal core type, on which metal tracks (not illustrated) are preferably made that are adapted to connect the LED 12 mounted on the circuit board 13 to the first electrical connections connected to the control unit 100.

Advantageously, the support body 2 of the light indicator 1 is extended around an extension axis W, preferably with central symmetry with respect to such extension axis W, and in particular is made of metal material, e.g. anodized aluminum.

In particular, the support body 2 is provided at its interior with a housing seat 14, within which the control unit 100 is preferably contained.

Figure 3:
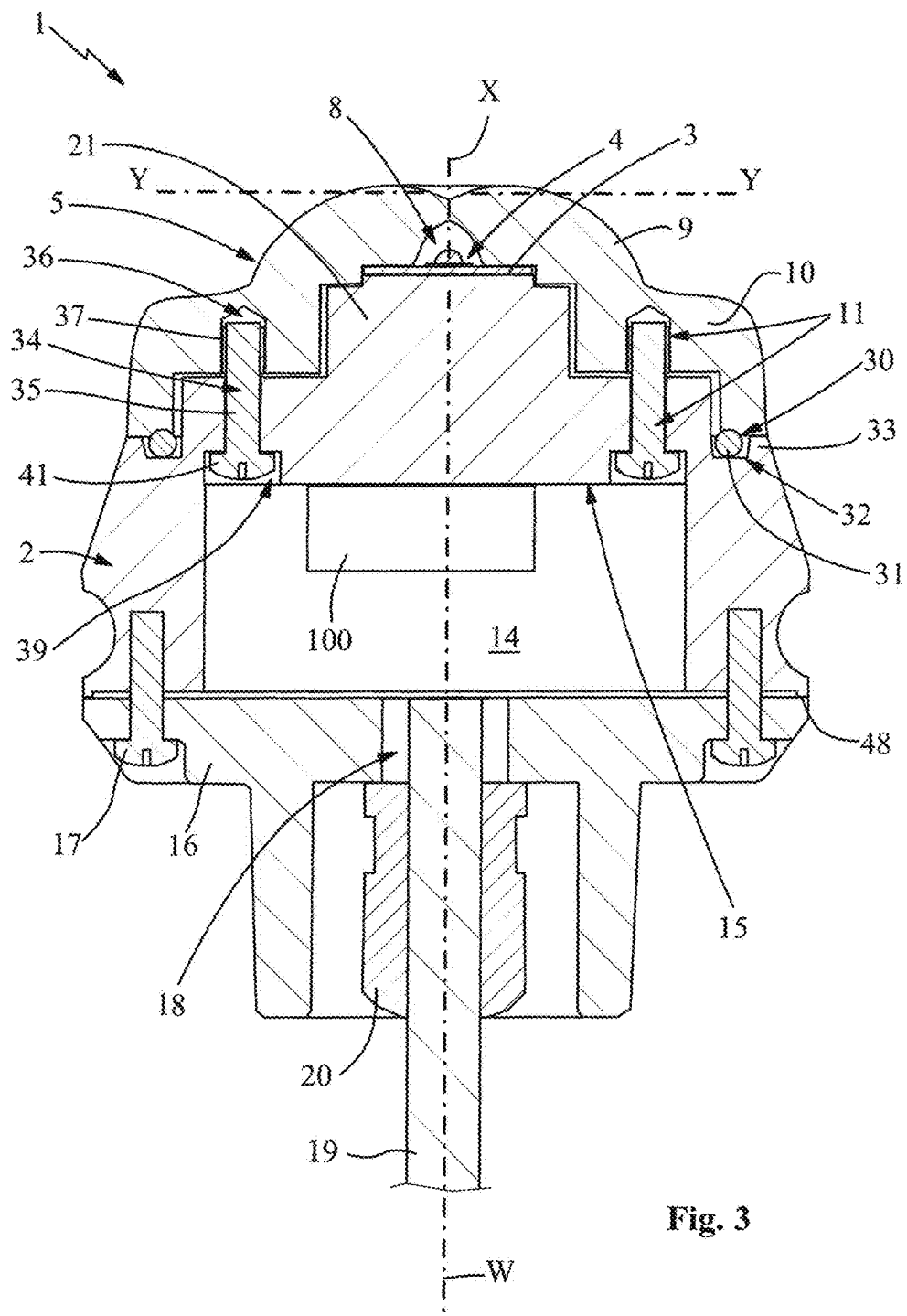
FIG. 3 shows a sectional view of the light indicator illustrated in FIG. 2 according to line III-III of the FIG. 2 itself.
Figure 4:
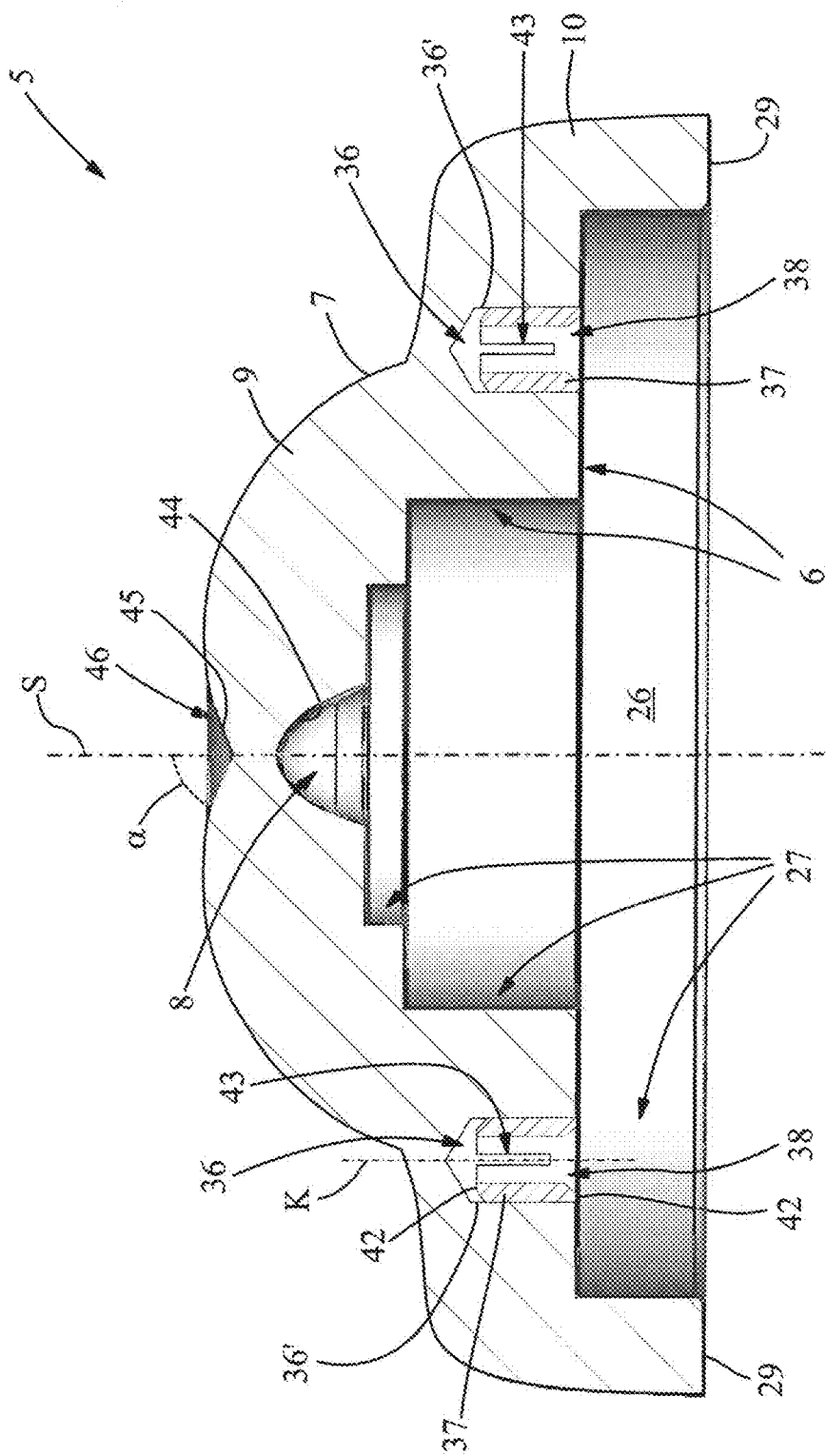
FIG. 4 shows a sectional view of a detail of the light indicator illustrated in FIG. 3 relative to an optical lens.
Figure 5:
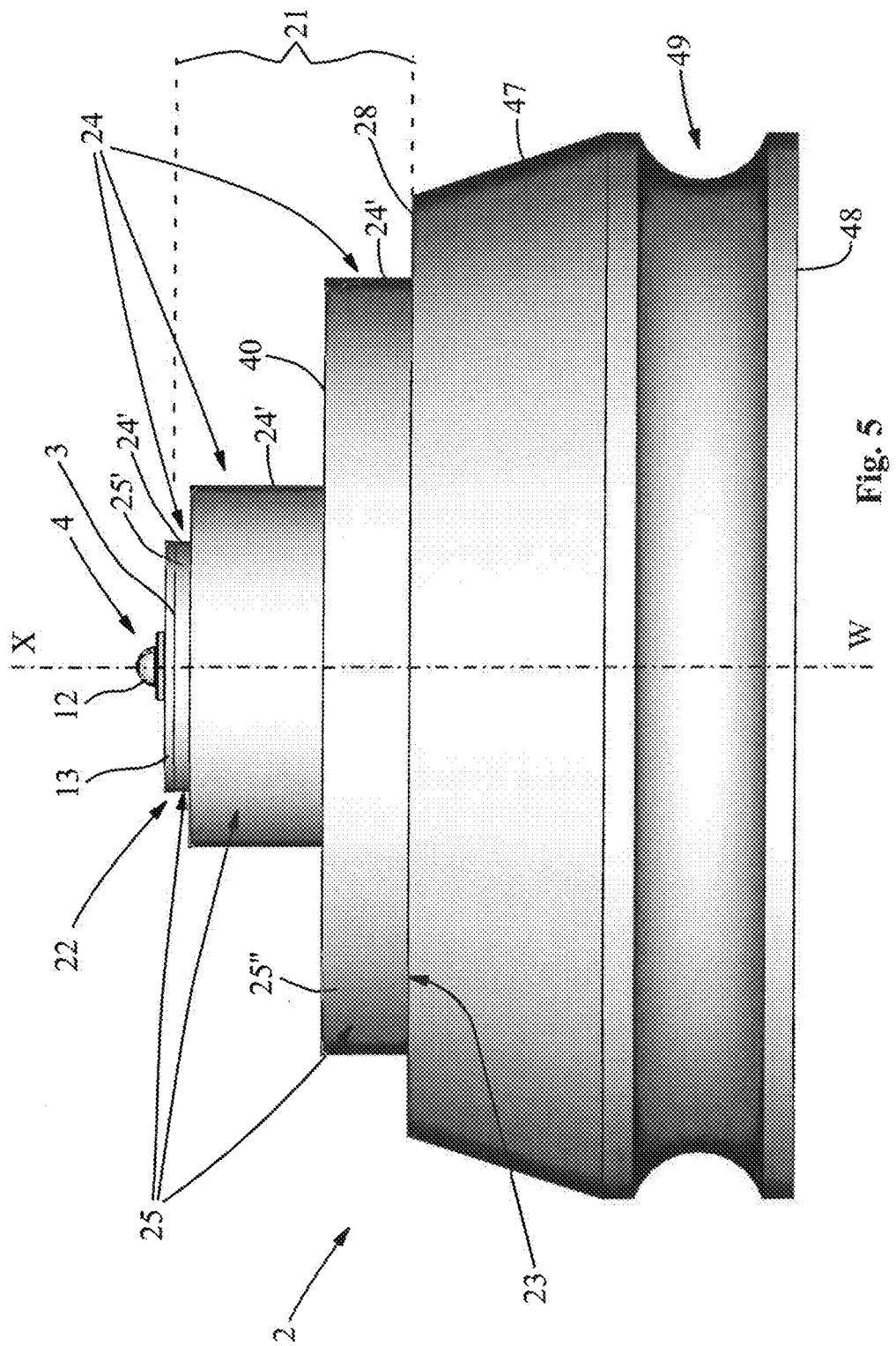
FIG. 5 shows a side view of a detail of the light indicator illustrated in FIG. 2, relative to a support body and to a light source.

In accordance with the embodiment illustrated in FIG. 3, the support body 2 is provided with an internal face 15, which is directed in the direction opposite the support face 3 (on which the light source 4 is placed) and in particular on the top it delimits the housing seat 14 of the support body 2 itself.

The housing seat 14 of the support body 2 is closed on the bottom by a bottom cover 16 fixed to the support body 2 preferably by means of fixing screws 17.

Preferably, the bottom cover 16 is provided with a through hole 18 traversed by an electrical duct 19 containing the second electrical connections adapted to connect the electrical energy source to the control unit 100 of the light indicator 1. The through hole 18 of the bottom cover 16 is suitably obstructed by means of a cable gland 20 inserted in the through hole 18 and arranged around the electrical duct 19.

Advantageously, the support body 2 comprises a projecting portion 21 preferably placed as an upper closure of the housing seat 14 of the support body 2, in particular internally delimiting, towards the housing seat 14, the aforesaid internal face 15 of the support body 2 itself.

The aforesaid projecting portion 21 is externally and projectingly extended according to the extension axis W, which has at least one component parallel to the light emission axis X of the light source 4 and is preferably orthogonal to the support face 3 at which the light source 4 is placed.

More in detail, the projecting portion 21 of the support body 2 is extended according to the extension axis W between an apical end 22, preferably upper, on which the support face 3 is arranged, and a base end 23, preferably lower.

In addition, the projecting portion 21 is provided with at least one lateral surface 24, with preferably cylindrical shape, extended around the extension axis W and arranged in particular orthogonal to the support face 3.

In accordance with the embodiment illustrated in the enclosed figures, the projecting portion 21 comprises multiple steps 25 arranged one on top of the other, in accordance with the embodiment of FIG. 3.

Each step 25 delimits a corresponding area 24' of the lateral surface 24 of the projecting portion 21 of the support body 2.

In particular, the steps 25 are arranged one on top of the other, aligned with each other with respect to the extension axis W and with width increasing from the upper to the lower step.

In accordance with the embodiment of FIG. 3, the steps 25 of the projecting portion 21 of the support body 2 comprise a top step 25', at the top delimited by the apical end 22 of the projecting portion 21, and a base step 25", preferably wider, at the lower part delimited by the base end 23 of the projecting portion 21.

In accordance with different embodiments of the present finding, not illustrated in the enclosed figures, the projecting portion 21 of the support body 2 can also comprise only one step 25 or the areas 24' of the lateral surface 24 can have shape that is not cylindrical (e.g. parallelepiped, frustoconical, trapezoidal, concave, etc.), without departing from the scope of the present patent.

Advantageously, the attachment portion 10 of the optical lens 5 is extended from the collimation portion 9 at least to cover the lateral surface 24 of the projecting portion 21, in particular extended around the extension axis W and being extended from the collimation portion 9 substantially in the form of bent band arranged around the lateral surface 24 of the projecting portion 21 itself.

The optical lens 5 is advantageously placed to cover the projecting portion 21 of the support body 2, with the attachment portion 10 which in particular is extended as base widening from the collimation portion 9.

Advantageously, the internal surface 6 of the optical lens 5 has concave form in a manner such to house, at its interior, the projecting portion 21 of the support body 2.

Preferably, the attachment portion 10 of the optical lens 5 is provided on the internal surface 6 of the latter with an internal cavity 26 that is counter-shaped with respect to the projecting portion 21.

In particular, the internal cavity 26 of the attachment portion 10 is provided with one or more peripheral seats 27, preferably with annular form, counter-shaped with respect to the corresponding steps 25 of the projecting portion 21.

Advantageously, the support body 2 comprises an abutment surface 28 extended around the base end 23 of the projecting portion 21, directed towards the optical lens 5 and tilted with respect to the extension axis W of the support body 2 itself. Preferably, the abutment surface 28 of the support body 2 is radially and projectingly extended (with respect to the extension axis W) from the base end 23 of the projecting portion 21 and is arranged in particular orthogonal to the extension axis W with preferably annular form. The attachment portion 10 of the optical lens 5 is provided with a base surface 29, preferably with annular form, and placed on the abutment surface 28 of the support body 2 in sealing relationship with the abutment surface 28 itself.

Preferably, the base surface 29 of the attachment portion 10 of the optical lens 5 delimits, on the lower part, the attachment portion 10 itself and is arranged in particular orthogonal to the extension axis W of the support body 2.

Advantageously, the light indicator 1 comprises sealing means 30 interposed between the attachment portion 10 of the optical lens 5 and the support body 2, in order to facilitate the hermetic insulation of the light source 4 (and preferably of the control unit 100 and electrical connections) from the external environment.

In particular, the sealing means 30 are interposed between the abutment surface 28 of the support body 2 and the base surface 29 of the attachment portion 10 of the optical lens 5.

Preferably, the sealing means 30 comprise an annular seal 31 compressed between the abutment surface 28 of the support body 2 and the base surface 29 of the attachment portion 10 of the optical lens 5, and extended around the extension axis W of the support body 2.

Advantageously, the annular seal 31 is housed in an annular seat 32 made on the abutment surface 28 of the support body 2.

In particular, the annular seat 32 is at least partially directed towards the base surface 29 of the attachment portion 10 of the optical lens 5 and is peripherally limited by an annular shoulder 33 of the support body 2 arranged around the annular seal 31 itself.

The retention means 11 of the light indicator 1 (which retain the optical lens 5 integral with the support body 2) comprise one or more retention bodies 34, each of which provided with a rod-like threaded portion 35, engaged in retention relationship within a corresponding engagement seat 36 made in the attachment portion 10 of the optical lens 5.

In particular, the aforesaid engagement seats 36 are made on the internal surface 6 of the optical lens 5 and, advantageously, each comprise a hole, preferably blind, with axis parallel to the extension axis W of the support body 2 and peripherally delimited by a lateral wall 36' of the engagement seat 36 itself.

Advantageously, the retention means 11 comprise one or more engagement elements 37, each inserted within the corresponding engagement seat 36 and provided with a threaded hole 38 with axis K preferably parallel to the extension axis W of the support body 2. The threaded portion 35 of the corresponding retention body 34 is screwed in such threaded hole 38.

Advantageously, the threaded portion 35 of each retention body 34 is inserted in a corresponding through hole 39 made in the support body 2, preferably in the projecting portion 21 of the support body 2, and in particular in the base step 25" of the projecting portion 21.

In particular, each through hole 39 is extended between the internal face 15 of the support body 2 and an external face 40 of the projecting portion 21 (directed in the direction opposite the aforesaid internal face 15) and advantageously defining the top of one of the steps 25 of the projecting portion 21 and in particular the top of the base step 25" of the projecting portion 21 itself.

Each retention body 34 comprises an abutment portion 41 thrustingly operating against the internal face 15 of the support body 2, in a manner such that the threaded portion 35 of the retention body 34, being engaged with the corresponding engagement element 37, retains the optical lens 5 attached to the support body 2.

Preferably, in accordance with the embodiment illustrated in the enclosed figures, each retention body 34 comprises a corresponding retention screw provided with a shank, which constitutes the threaded portion 35 of the corresponding retention body 34, and with a head which constitutes the abutment portion 41 of the retention body 34 itself.

Advantageously, each engagement element 37 has substantially tubular shape extended, parallel to the axis K of the corresponding threaded hole 38, between two end edges 42 thereof.

In particular, each engagement element 37 comprises an internally threaded bush made of metal material, e.g. brass.

Advantageously, the threaded portion 35 of each retention body 34 is arranged in order to thrustingly operate against the corresponding engagement element 37 according to a direction of radial thrust with respect to the axis K of the corresponding threaded hole 38. In this manner, the threaded portion 35 of the retention body 34 compresses the corresponding engagement element 37 against the lateral wall 36' of the corresponding engagement seat 36 in order to retain the engagement element 37 fixed to the lateral wall 36' of the corresponding engagement seat 36.

Advantageously, each engagement element 37 is provided with at least one longitudinal slit 43 parallel to the axis K of the threaded hole 38 of the engagement element 37 and extended from one of the end edges 42 of the engagement element 37 itself.

In particular, each engagement element 37 is provided with at least two aforesaid longitudinal slits 43, preferably arranged in symmetric position with respect to the axis K of the threaded hole 38.

The aforesaid longitudinal slits 43 advantageously allow the engagement element 37 to be radially widened under the action of the aforesaid thrust force exerted by the threaded portion 35 of the corresponding retention body 34, such that the engagement element 37 can be pressed against the lateral wall 36' of the corresponding engagement seat 36.

Preferably, the optical lens 5 of the light indicator 1 is made of polymer material, in particular polycarbonate.

Advantageously, the optical lens 5 of the light indicator 1 is provided with a central axis of symmetry S preferably aligned with the light emission axis X of the light source 4.

The cavity 8 of the optical lens 5, in which the light source 4 is housed, is preferably arranged aligned with the aforesaid central axis of symmetry S and is delimited by a curved surface 44 susceptible of being intercepted by the light rays emitted by the light source 4, in a manner such that at least part of such light rays reaches, via refraction, the external surface 7 of the optical lens 5.

Preferably, the collimation portion 9 of the optical lens 5 is shaped, on the external surface 7, substantially cap-like.

Advantageously, the external surface 7 of the optical lens 5 is provided with an interception zone 45, substantially frustoconical, made on the collimation portion 9, and extended symmetrically around the central axis of symmetry S of the optical lens 5. Such interception zone 45 is arranged for intercepting at least one part of the light rays emitted by the light source 4 and for projecting the corresponding collimated beams radially with respect to the central axis of symmetry S of the optical lens 5.

In particular, the aforesaid interception zone 45 of the external surface 7 of the optical lens 5 delimits a central concavity 46 of the external surface 7 itself, extended around the central axis of symmetry S.

Preferably, the interception zone 45 of the external surface 7 is extended around the central axis of symmetry S with a generatrix section tilted a specific angle α with respect to the central axis of symmetry S, comprised between about 60° and 80° and equal to about 70°.

Preferably, the generatrix section of the interception zone 45 has a curved progression or linear progression with sections that approximate a curved line.

Advantageously, the interception zone 45 of the external surface 7 of the collimation portion 9 of the optical lens 5 is adapted to project the collimated light beams along projection directions Y that are radial with respect to the central axis of symmetry S and preferably over an angle of 360° around such central axis of symmetry S.

Preferably, the collimated light beams projected from the collimation portion 9 of the optical lens 5 have vertical aperture angle of about 10°, in particular of about 15°.

Suitably, one part, preferably smaller, of the light rays (coming from the light source 4) intercepted by the collimation portion 9 of the optical lens 5 are projected from the external surface 7 of the latter with light beams propagated within an emission cone having axis coinciding with the light emission axis X, in particular such to project such light beams upward.

Advantageously, the support body 2 of the light indicator 1 is provided with an external lateral side 47, extended outside the optical lens 5 and extended around the extension axis W of the support body 2 itself.

In particular, the aforesaid external lateral side 47 of the support body 2 is extended, according to the extension axis W, between the abutment surface 28 of the projecting portion 21 and a lower edge 48 of the support body 2 itself, the bottom cover 16 being abuttingly arranged against such lower edge 48.

Figure 7:
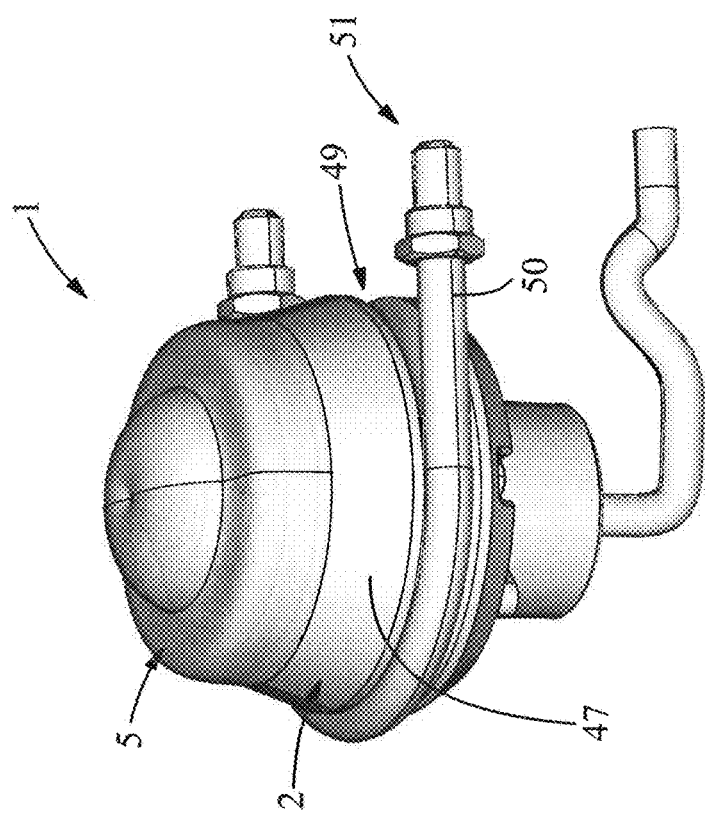
FIGS. 6 and 7 illustrate the present light indicator installed on two corresponding different support structures.

Advantageously, the external lateral side 47 of the support body 2 is provided with an annular groove 49, and along one section thereof a curved element 50 of a support structure 51 is susceptible of being engaged, on which the light indicator 1 is intended to be mounted, as illustrated in the example of FIG. 7.

The aforesaid curved element 50 comprises preferably a U-shaped threaded bracket (also termed "U bolt"), made for example of metal material.

Figure 6:
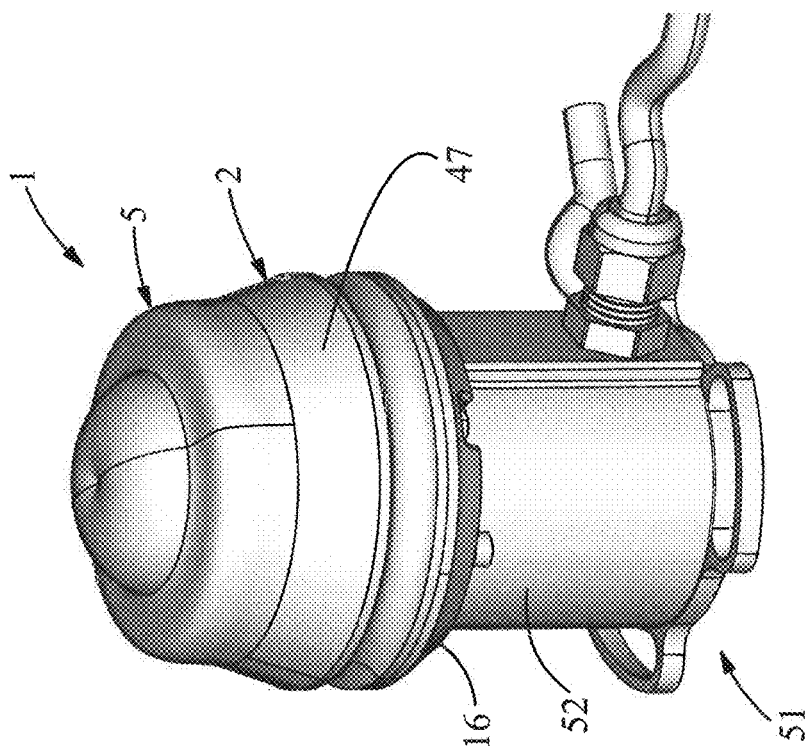

Of course, the light indicator 1 is susceptible of being fixed to support structures 51 different from those provided with U-shaped brackets, and can for example be mounted on an abutment base 52 fixed to the bottom cover 16 of the light indicator 1 itself, as illustrated in the example of FIG. 6.

The finding thus conceived therefore attains the pre-established objects.

In particular, the optical lens 5 provided with the collimation portion 9 and with the attachment portion 10 according to the present finding allows protecting the light source 4 and advantageously the electrical and electronic components of the light indicator 1 without having to use further cover elements, with a consequent structural simplification of the light indicator 1 itself.

The invention claimed is:
1. Light indicator, which comprises:
(a) support body provided with a support face;
(b) at least one light source arranged at said support face and provided with a light emission axis (X); and
(c) at least one optical lens, which is placed to cover said support face, and is provided with an internal surface at least partially directed towards said support face and defining at least one cavity in which said light source is housed, and which is provided with an external surface intended to come into contact with an external environment;

said optical lens comprising:
(i) at least one collimation portion placed to intercept the light emission axis (X) of said light source, and arranged for at least partially intercepting light rays emitted by said light source and for projecting corresponding collimated light beams along projection directions (Y) that are radial with respect to said light emission axis (X);
(ii) at least one attachment portion, projectingly extended around said collimation portion, integrally made with said collimation portion, and sealingly fixed to said support body; and
(iii) retention means connected to said support body and to the attachment portion of said optical lens and adapted to retain said optical lens integral with said support body;

wherein said support body comprises a projecting portion which is projectingly and externally extended according to an extension axis (W), having at least one component parallel to the light emission axis (X) of said light source, between an apical end, on which said support face is arranged, and a base end, and which is provided with at least one lateral surface extended around said extension axis (W);

wherein the attachment portion of said optical lens is extended from said collimation portion at least to cover the lateral surface of said projecting portion;

wherein the attachment portion of said optical lens is provided on said internal surface with at least one internal cavity that is counter-shaped with respect to said projecting portion;

wherein said projecting portion comprises multiple steps arranged one on top of the other, wherein each step delimits a corresponding area of the lateral surface of the projecting portion of said support body;

wherein the internal cavity of said attachment portion is provided with one or more peripheral seats counter-shaped with respect to the corresponding steps of said projecting portion and adjacent to said corresponding steps; and wherein said retention means comprise at least one retention body provided with a rod-like threaded portion, engaged in retention relationship within a corresponding engagement seat made in the attachment portion of said optical lens.

2. Light indicator according to claim 1, wherein said optical lens is placed to cover said projecting portion.

3. Light indicator according to claim 1, wherein said support body comprises at least one abutment surface extended around the base end of said projecting portion and directed towards said optical lens; the attachment portion of said optical lens being provided with a base surface placed on the abutment surface of said support body in sealing relationship with said abutment surface.

4. Light indicator according to claim 3, wherein the abutment surface of said support body and the base surface of the attachment portion of said optical lens are orthogonal to said extension axis (W).

5. Light indicator according to claim 3, comprising sealing means interposed between the attachment portion of said optical lens and said support body, wherein said sealing means are interposed between the abutment surface of said support body and the base surface of the attachment portion of said optical lens.

6. Light indicator according to claim 5, wherein said sealing means comprise at least one annular seal housed in an annular seat made on the abutment surface of said support body.

7. Light indicator according to claim 1, comprising sealing means interposed between the attachment portion of said optical lens and said support body.

8. Light indicator according to claim 1, wherein said engagement seat is made on the internal surface of said optical lens.

9. Light indicator according to claim 1, wherein said optical lens is provided with a central axis of symmetry (S) aligned with the light emission axis (X) of said light source.

10. Light indicator according to claim 9, wherein the external surface of said optical lens is provided with an interception zone made on said collimation portion, extended symmetrically around said central axis of symmetry (S), and arranged for intercepting at least one part of the light rays emitted by said light source and for projecting corresponding said collimated light beams radially with respect to said central axis of symmetry (S).

11. Light indicator according to claim 1, wherein the collimation portion of said optical lens has substantially cap-like shape.

12. Light indicator, comprising:
(a) support body provided with a support face;
(b) at least one light source arranged at said support face and provided with a light emission axis (X);
(c) at least one optical lens, which is placed to cover said support face, and is provided with an internal surface at least partially directed towards said support face and defining at least one cavity in which said light source is housed, and which is provided with an external surface intended to come into contact with an external environment;
said optical lens comprising:

(i) at least one collimation portion placed to intercept the light emission axis (X) of said light source, and arranged for at least partially intercepting light rays emitted by said light source and for projecting corresponding collimated light beams;
(ii) at least one attachment portion, projectingly extended around said collimation portion, integrally made with said collimation portion, and sealingly fixed to said support body;
(iii) retention means connected to said support body and to the attachment portion of said optical lens and adapted to retain said optical lens integral with said support body;

wherein said retention means comprise at least one retention body provided with a rod-like threaded portion, engaged in retention relationship within a corresponding engagement seat made in the attachment portion of said optical lens;

wherein said retention means comprise at least one engagement element inserted within said engagement seat and provided with a threaded hole with an axis (K), and wherein the threaded portion of said retention body is screwed in said threaded hole.

13. Light indicator according to claim 12, wherein the threaded portion of said retention body is arranged in order to thrustingly operate, according to a direction of radial thrust with respect to the axis (K) of said threaded hole, against said engagement element, compressing the latter against a lateral wall of said engagement seat.

14. Light indicator according to claim 13, wherein said engagement element has substantially tubular shape extended, parallel to the axis (K) of said threaded hole, between two end edges thereof, and is provided with at least one longitudinal slit parallel to said axis (K) and extended from one of said end edges.

15. Light indicator according to claim 12, wherein the threaded portion of said retention body is inserted in a corresponding through hole made in said support body, and said retention body comprises an abutment portion thrustingly operating against an internal face of said support body directed in a direction opposite the support face of said support body.

16. Light indicator according to claim 15, wherein said support body comprises a projecting portion:
(a) which is projectingly and externally extended according to an extension axis (W), having at least one component parallel to the light emission axis (X) of said light source, between an apical end, on which said support face is arranged, and a base end, and
(b) which is provided with at least one lateral surface extended around said extension axis (W);
wherein the attachment portion of said optical lens is extended from said collimation portion at least to cover the lateral surface of said projecting portion; and
wherein said through hole is made in the projecting portion of said support body.

17. Light indicator, comprising:
(a) a support body provided with a support face;
(b) at least one light source arranged at said support face and provided with a light emission axis (X);
(c) at least one optical lens, which is placed to cover said support face, and is provided with an internal surface at least partially directed towards said support face and defining at least one cavity in which said light source is housed, and which is provided with an external surface intended to come into contact with an external environment;

said optical lens comprising:
- (i) at least one collimation portion placed to intercept the light emission axis (X) of said light source, and arranged for at least partially intercepting light rays emitted by said light source and for projecting corresponding collimated light beams;
- (ii) at least one attachment portion, projectingly extended around said collimation portion, integrally made with said collimation portion, and sealingly fixed to said support body;
- (iii) retention means connected to said support body and to the attachment portion of said optical lens and adapted to retain said optical lens integral with said support body;

wherein said support body is provided with an external lateral side, extended outside said optical lens and provided with an annular groove, along at least one section thereof a curved element of a support structure susceptible of being engaged.

\* \* \* \* \*